(12) United States Patent
Sundstrom et al.

(10) Patent No.: US 7,989,092 B2
(45) Date of Patent: Aug. 2, 2011

(54) FINE GRAINED CEMENTED CARBIDE FOR TURNING IN HEAT RESISTANT SUPER ALLOYS (HRSA)

(75) Inventors: Erik Sundstrom, Fagersta (SE); Jacob Sjolen, Fagersta (SE); Niklas Ahlen, Soderbarke (SE)

(73) Assignee: Seco Tools AB, Fagersta (SE)

( * ) Notice: Subject to any disclaimer, the term of this patent is extended or adjusted under 35 U.S.C. 154(b) by 383 days.

(21) Appl. No.: 12/168,459

(22) Filed: Jul. 7, 2008

(65) Prior Publication Data
US 2009/0016831 A1 Jan. 15, 2009

(30) Foreign Application Priority Data
Jul. 13, 2007 (SE) ...................................... 0701702

(51) Int. Cl.
*B32B 9/00* (2006.01)
(52) U.S. Cl. ............ 428/697; 51/307; 51/309; 428/336; 428/698; 428/699
(58) Field of Classification Search ............... 51/307, 51/309; 428/336, 697, 698, 699; 75/240
See application file for complete search history.

(56) References Cited

U.S. PATENT DOCUMENTS

| | | | | |
|---|---|---|---|---|
| 6,214,287 B1 * | 4/2001 | Waldenstrom | | 75/240 |
| 6,273,930 B1 * | 8/2001 | Waldenstrom | | 75/240 |
| 6,413,293 B1 * | 7/2002 | Grearson et al. | | 75/240 |
| 6,586,122 B2 * | 7/2003 | Ishikawa et al. | | 51/307 |
| 7,056,602 B2 * | 6/2006 | Horling et al. | | 428/699 |
| 7,060,345 B2 * | 6/2006 | Fukui et al. | | 428/698 |
| 7,083,868 B2 * | 8/2006 | Horling et al. | | 428/697 |
| 7,150,925 B2 * | 12/2006 | Sato et al. | | 51/309 |
| 7,592,076 B2 * | 9/2009 | Flink et al. | | 428/697 |
| 2005/0019612 A1 | 1/2005 | Sato et al. | | 428/698 |
| 2005/0129951 A1 * | 6/2005 | Collin et al. | | 428/336 |
| 2006/0292399 A1 * | 12/2006 | Sjolen et al. | | 428/698 |

FOREIGN PATENT DOCUMENTS

| | | |
|---|---|---|
| EP | 1 174 528 A2 | 1/2002 |
| EP | 1 400 609 A1 | 3/2004 |
| EP | 1 452 621 A2 | 9/2004 |
| EP | 1 736 565 A1 | 12/2006 |
| WO | 2006/118513 A1 | 11/2006 |

* cited by examiner

*Primary Examiner* — Archene Turner
(74) *Attorney, Agent, or Firm* — Young & Thompson

(57) ABSTRACT

Coated cemented carbide inserts, particularly useful in fine turning of super alloys, are disclosed. The inserts are characterized by a composition of a cemented carbide of WC, about 4.0 wt-% Co to about 7.0 wt-% Co, about 0.25 wt-% Cr to 0.50 wt-% Cr, and a coercivity (Hc) of about 28 kA/m to about 38 kA/m. The coating comprises a single $(Ti_{1-x}Si_x)N$-layer, where x is between about 0.1 and about 0.25, with a crystal structure of NaCl type and a total thickness between about 0.5 µm and about 2.0 µm with a strong (200)-texture.

9 Claims, 1 Drawing Sheet

FINE GRAINED CEMENTED CARBIDE FOR TURNING IN HEAT RESISTANT SUPER ALLOYS (HRSA)

CROSS REFERENCE TO RELATED APPLICATIONS

This application claims priority to Swedish Application No. 0701702-3 filed Jul. 13, 2007, the entire disclosure of which is incorporated herein by reference.

FIELD OF THE INVENTION

The present invention relates to coated cutting tool inserts, which are particularly useful for turning of heat resistant super alloys. More specifically, the present invention relates to hard fine grained substrates in combination with a thin very hard adherent PVD-coating that greatly improve the wear resistance.

BACKGROUND OF THE INVENTION

Super alloys are a broad range of nickel, iron, and cobalt base alloys developed specifically for applications demanding exceptional mechanical and chemical properties at elevated temperatures. The classic use for these alloys is in the hot end of aircraft engines and land based turbines. Almost every metallurgical change made to improve the high temperature properties makes it more difficult to machine these alloys.

As high temperature strength is increased, the alloys become harder and stiffer at the cutting temperature. It results in increased cutting forces and increased wear on the cutting edge during machining.

Because stronger materials generate more heat during chip formation and because the thermal heat conductivity of these alloys is relatively low, very high cutting temperatures are generated, this also contribute to an increased wear of the cutting edge.

To make matters even worse, as the alloys are heat treated to modify the as cast or solution treated properties, abrasive carbide precipitates or other second phase particles often form. These particles do also cause rapid wear of the cutting edge.

EP 1174528 provides a multilayer-coated cutting tool. The first hard coating film is formed on the substrate and a second hard coating film formed on the first hard coating film. The first hard coating film comprises one or more of Ti, Al, and Cr, and one or more of N, B, C, and O. The second hard coating film comprises Si, and one or more metallic elements selected from the group consisting of metallic elements of Groups 4a, 5a and 6a of the Periodic Table and Al, and one or more non-metallic elements selected from the group consisting of N, B, C, and O.

WO 2006/118513 relates to a cutting tool insert, solid end mill, or drill, comprising a substrate and a coating. The coating is composed of a cubic C-(Me, Si) N-phase without coexisting amorphous phase. It is deposited by arc evaporation.

EP 1736565 relates to a cutting tool insert, solid end mill, or drill, comprising a substrate and a coating. The coating is composed of one or more layers of refractory compounds of which at least one layer comprises a cubic (Me,Si)X phase, where Me is one or more of the elements Ti, V, Cr, Zr, Nb, Mo, Hf, Ta and Al, and X is one or more of the elements N, C, O or B. The ratio R=(at-% X)/(at-% Me) of the c-MeSiX phase is between 0.5 and 1.0 and X contains less than 30 at-% of O+B.

US 2005/0019612 relates to a coated cutting tool made of cemented carbide with a hard coating layer, wherein (a) a crystal orientation hysteresis layer which consists of a carbonitride compound layer and (b) a hard coating layer which consists of a layer of nitride compound and has a well defined crystal orientation and/or degree of crystallinity are formed on the surface of a cemented carbide substrate, preferably on the surface of a tungsten carbide based cemented carbide or titanium carbonitride based cermet by physical vapor deposition, wherein the crystal orientation hysteresis layer is deposited between the surface of a cemented carbide substrate and the hard coating layer.

What is needed is a coated cemented carbide for fine wet turning of super alloys with improved wear resistance. The invention is directed to these, as well as other, important needs.

SUMMARY OF THE INVENTION

It has now surprisingly been found that a cemented carbide with low Co-content and submicron grain size coated with a single (Ti, Si)N-layer grown using physical vapor deposition greatly improves the productivity at fine turning of super alloys under wet conditions.

In one embodiment, the invention is directed to cutting tool inserts having a flank face, comprising:
a. a cemented carbide body having an edge radius, comprising:
tungsten carbide (WC);
about 4.0 wt-% to about 7.0 wt-% cobalt (Co);
about 0.25 wt-% to about 0.50 wt-% chromium (Cr); and
wherein said cemented carbide body has a coercivity, Hc, of about 28 kA/m to about 38 kA/m; and
b. a coating, comprising:
a single layer, comprising $(Ti_{1-x}Si_x)N$, wherein x is between about 0.1 and about 0.25;
wherein said layer has a crystal structure of NaCl type and a total thickness between about 0.5 µm and 2.0 µm measured on the middle of said flank face;
wherein said layer has a texture coefficient TC(200)>about 1.5, the texture coefficient (TC) being defined as:

$$TC(hkl) = \frac{I(hkl)}{I_0(hkl)} \left[ \frac{1}{n} \sum_{n=1}^{n} \frac{I(hkl)}{I_0(hkl)} \right]^{-1}$$

where:
I(hkl)=intensity of the (hkl) reflection;
$I_o$(hkl)=standard intensity according to JCPDS card no 38-1420;
n=number of reflections used in the calculation;
(hkl) reflections used are: (111), (200), and (220).

In another embodiment, the invention is directed to methods for making a cutting tool insert having a flank face, comprising a cemented carbide body and a coating, comprising the steps of:
providing a substrate made by conventional powder metallurgical methods milling, pressing, and sintering with a composition comprising:
tungsten carbide (WC);
about 4.0 wt-% to about 7.0 wt-% cobalt (Co);
about 0.25 wt-% to about 0.50 wt-% chromium (Cr); and
wherein said composition has a coercivity, Hc, of about 28 kA/m to about 38 kA/m; and
depositing a single layer, comprising $(Ti_{1-x}Si_x)N$, wherein x is between about 0.1 and about 0.25;

wherein said layer has a crystal structure of NaCl type and a total thickness between about 0.5 µm and about 2.0 µm, measured on the middle of said flank face;

wherein said layer has a texture coefficient TC(200)>about 1.5, the texture coefficient (TC) being defined as:

$$TC(hkl) = \frac{I(hkl)}{I_0(hkl)} \left[ \frac{1}{n} \sum_{n=1}^{n} \frac{I(hkl)}{I_0(hkl)} \right]^{-1}$$

where:
I(hkl)=intensity of the (hkl) reflection;
$I_o$(hkl)=standard intensity according to JCPDS card no 38-1420;
n=number of reflections used in the calculation;
(hkl) reflections used are: (111), (200), and (220).

using arc evaporation of an alloyed, or Ti+Si composite cathode having a composition comprising:
about 60 at-% Ti to about 90 at-% Ti, and balance Si;
with an evaporation current of between about 50 A and about 200 A and a substrate bias of between about −10 V and about −150 V, and a deposition temperature of between about 400° C. and about 700° C., and grown in an Ar+$N_2$ atmosphere comprising about 0 vol-% Ar to about 50 vol-% Ar, at a total pressure of about 0.5 Pa to about 9.0 Pa.

In yet other embodiments, the invention is directed to methods for fine wet turning of a super alloy, comprising the steps of:
providing the insert described above;
wet cutting said super alloy with said insert at a cutting speed of about 35 m/min to about 130 m/min, a cutting depth of about 0.1 mm to about 0.75 mm; and a feed of about 0.05 mm/rev to about 0.25 mm/rev.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE INVENTION

Figure 1:
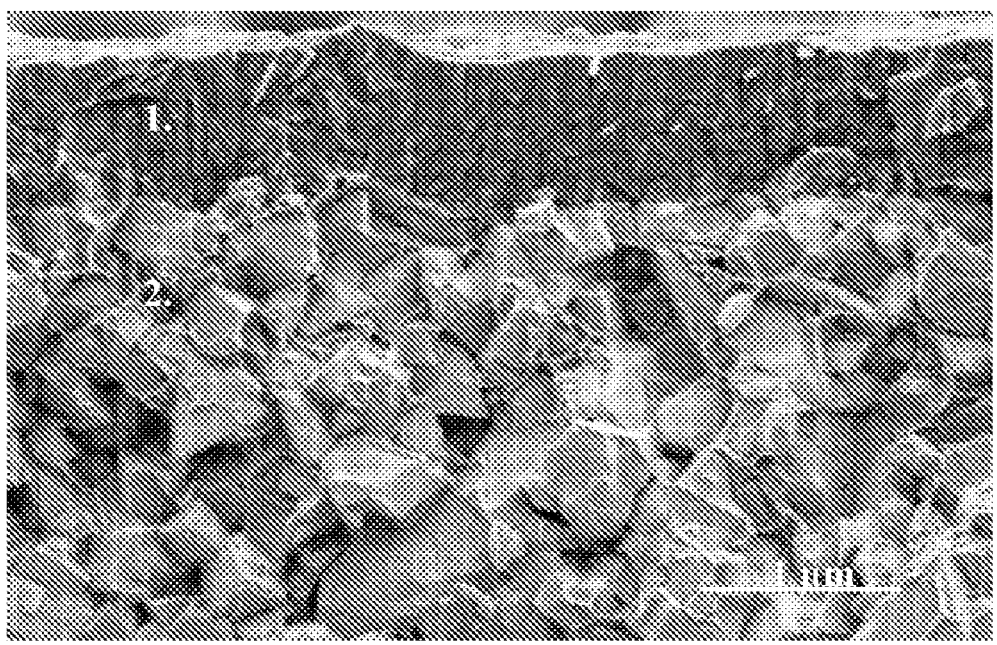
FIG. 1 shows a fracture surface of a coated cemented carbide substrate according to the present invention in which:
1. Cemented carbide body.
2. Single layer of (Ti, Si)N

The present invention relates to a coated cutting tool insert particularly useful for turning of heat resistant super alloys. Hard fine grained substrates in combination with a thin very hard adherent PVD-coating greatly improve the wear resistance. It has now surprisingly been found that a cemented carbide with low Co-content and submicron grain size coated with a single (Ti, Si)N-layer grown using physical vapor deposition greatly improves the productivity at fine turning of super alloys under wet conditions.

In one embodiment, the invention is directed to cutting tool inserts having a flank face, comprising:
a. a cemented carbide body having an edge radius, comprising:
tungsten carbide (WC);
about 4.0 wt-% to about 7.0 wt-% cobalt (Co);
about 0.25 wt-% to about 0.50 wt-% chromium (Cr); and wherein said cemented carbide body has a coercivity, Hc, of about 28 kA/m to about 38 kA/m; and
b. a coating, comprising:
a single layer, comprising $(Ti_{1-x}Si_x)N$, wherein x is between about 0.1 and about 0.25;

wherein said layer has a crystal structure of NaCl type and a total thickness between about 0.5 µm and 2.0 µm measured on the middle of said flank face;

wherein said layer has a texture coefficient TC(200)>about 1.5, the texture coefficient (TC) being defined as:

$$TC(hkl) = \frac{I(hkl)}{I_0(hkl)} \left[ \frac{1}{n} \sum_{n=1}^{n} \frac{I(hkl)}{I_0(hkl)} \right]^{-1}$$

where:
I(hkl)=intensity of the (hkl) reflection;
$I_o$(hkl)=standard intensity according to JCPDS card no 38-1420;
n=number of reflections used in the calculation;
(hkl) reflections used are: (111), (200), and (220).

According to the present invention there is now provided a coated cutting tool insert consisting of a substrate and a coating. The substrate consists of WC, about 4.0-7.0 wt-% Co, preferably about 4.5-6.0 wt-% Co, most preferably about 4.8-5.2 wt-% Co, about 0.25-0.50 wt-% Cr, preferably about 0.30-0.45 wt-% Cr, most preferably about 0.34-0.40 wt-% Cr and a coercivity (Hc) of about 28-38 kA/m, preferably about 30-36 kA/m, preferably about 31-34 kA/m. Preferably the edge radius of the inserts before coating is between about 0 and about 25 µm.

The coating consists of a single layer of $(Ti_{1-x}Si_x)N$, where x is between about 0.1 and about 0.25, preferably between about 0.12 and about 0.23, most preferably between about 0.18 and about 0.21. The crystal structure of the (Ti, Si)N-layer is of NaCl type. The total thickness of the layer is between about 0.5 and about 2.0 µm, preferably between about 0.7 and about 1.5 µm. The thickness is measured on the middle of the flank face.

The layer may contain Al in such an amount that in $(Ti_{1-a-b}Si_aAl_b)N$, b≦a, about 0.1≦a≦about 0.25 and about 0.10≦a+b≦about 0.30.

The layer is strongly textured in the (200)-direction, with a texture coefficient of: TC(200)>about 1.5, preferably>about 2.0, most preferably>about 2.2.

The texture coefficient (TC) is defined as follows:

$$TC(hkl) = \frac{I(hkl)}{I_0(hkl)} \left[ \frac{1}{n} \sum_{n=1}^{n} \frac{I(hkl)}{I_0(hkl)} \right]^{-1}$$

where:
I(hkl)=intensity of the (hkl) reflection;
$I_o$(hkl)=standard intensity according to JCPDS card no 38-1420;
n=number of reflections used in the calculation;
(hkl) reflections used are: (111), (200), and (220).

In another embodiment, the invention is directed to methods for making a cutting tool insert having a flank face, comprising a cemented carbide body and a coating, comprising the steps of:
providing a substrate made by conventional powder metallurgical methods milling, pressing, and sintering with a composition comprising:

tungsten carbide (WC);
  about 4.0 wt-% to about 7.0 wt-% cobalt (Co);
  about 0.25 wt-% to about 0.50 wt-% chromium (Cr); and
  wherein said composition has a coercivity, Hc, of about 28 kA/m to about 38 kA/m; and
depositing a single layer, comprising $(Ti_{1-x}Si_x)N$, wherein x is between about 0.1 and about 0.25;
  wherein said layer has a crystal structure of NaCl type and a total thickness between about 0.5 μm and about 2.0 μm, measured on the middle of said flank face;
  wherein said layer has a texture coefficient TC(200)>about 1.5, the texture coefficient (TC) being defined as:

$$TC(hkl) = \frac{I(hkl)}{I_0(hkl)} \left[ \frac{1}{n} \sum_{n=1}^{n} \frac{I(hkl)}{I_0(hkl)} \right]^{-1}$$

where:
I(hkl)=intensity of the (hkl) reflection;
$I_0$(hkl)=standard intensity according to JCPDS card no 38-1420;
n=number of reflections used in the calculation;
(hkl) reflections used are: (111), (200), and (220).
using arc evaporation of an alloyed, or Ti+Si composite cathode having a composition comprising:
  about 60 at-% Ti to about 90 at-% Ti, and balance Si;
with an evaporation current of between about 50 A and about 200 A and a substrate bias of between about −10 V and about −150 V, and a deposition temperature of between about 400° C. and about 700° C., and grown in an Ar+$N_2$ atmosphere comprising about 0 vol-% Ar to about 50 vol-% Ar, at a total pressure of about 0.5 Pa to about 9.0 Pa.

The present invention also relates to a method of making a coated cutting tool insert consisting of a substrate and a coating. The substrate is made by conventional powder metallurgical methods of milling, pressing, and sintering. It has a composition of WC, about 4.0-7.0 wt-% Co, preferably about 4.5-6.0 wt-% Co, most preferably about 4.8-5.2 wt-% Co, about 0.25-0.50 wt-% Cr, preferably about 0.30-0.45 wt-% Cr, most preferably about 0.34-0.40 wt-% Cr and a coercivity (Hc) of about 28-38 kA/m, preferably about 30-35 kA/m, most preferably about 31-32 kA/m.

Before coating the inserts are edge-honed by wet-blasting to an edge radius of preferably about 0 and about 25 μm.

The method used to grow the layer comprising (Ti,Si)N phase, is based on arc evaporation of an alloyed, or composite cathode, under the following conditions: The Ti+Si cathode composition is about 60 to about 90 at-% Ti, preferably about 70 to about 90 at-% Ti, and balance Si.

Before coating the surface is cleaned preferably by applying a soft ion etching. The ion etching is performed in an Ar atmosphere or in a mixture of Ar and $H_2$.

The evaporation current is between about 50 A and about 200 A depending on cathode size and cathode material. When using cathodes of 63 mm in diameter the evaporation current is preferably between about 60 A and about 120 A. The substrate bias is between about −10 V and about −150 V, preferably between about −40 V and about −70 V. The deposition temperature is between about 400° C. and about 700° C., preferably between about 500° C. and about 700° C.

The (Ti,Si)N-layer is grown in an Ar+$N_2$ atmosphere consisting of about 0-50 vol-% Ar, preferably about 0-20 vol-% Ar, at a total pressure of about 0.5 Pa to about 9.0 Pa, preferably about 1.5 Pa to about 5.0 Pa.

If Al should be present in the layer the cathode should comprise Al to a suitable amount to obtain the desired composition.

In yet other embodiments, the invention is directed to methods for fine wet turning of a superalloy, comprising the steps of:
  providing the insert described above;
  wet cutting said super alloy with said insert at a cutting speed of about 35 m/min to about 130 m/min, a cutting depth of about 0.1 mm to about 0.75 mm; and a feed of about 0.05 mm/rev to about 0.25 mm/rev.

The present invention also relates to the use of inserts according to above for wet, fine turning of super alloys such as Inconel 718, Inconel 625, Nimonic 81, Waspaloy or Ti6Al4V, at a cutting speed of about 35-130 m/min, a cutting depth about 0.1-0.75 mm and a feed of about 0.05-0.25 mm/rev.

The present invention is further defined in the following Examples, in which all parts and percentages are by weight, unless otherwise stated. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various usages and conditions.

EXAMPLES

Example 1

Cemented carbide cutting tool insert of type CNMG120408-MF1 consisting of a substrate and a coating were prepared. The substrate was made by milling, pressing and sintering. The composition was 5 wt-% Co, 0.37 wt-% Cr and rest WC. The coercivity was 31.5 kA/m corresponding to average WC grain size of about 0.5 μm.

The inserts were wet-blasted to an edge radius of about 20-25 μm.

The coating was grown using arc evaporation of a $Ti_{0.80}Si_{0.20}$ cathode, 63 mm in diameter. The deposition was carried out in a 99.995% pure $N_2$ atmosphere at a total pressure of 4.0 Pa, using a substrate bias of −110 V for 60 minutes. The deposition temperature was about 530° C. X-ray diffraction showed a strong (002)-texture with (TC)=2.3 and FIG. 1 shows a fracture surface of the insert.

Example 2

Coated inserts from Example 1 were tested with regard to wear resistance at the following conditions: As reference Seco CP200, a commonly used grade for the mentioned application, was used.

| Work piece: | Cylindrical bar |
|---|---|
| Material: | Inconel 718 |
| Cutting speed: | 70 m/min |
| Feed: | 0.2 mm/rev |
| Depth of cut: | 0.5 mm |
| Remarks: | Flood coolant |

Results

The tool life criterion was the maximum time in cut in minutes at a cutting speed of 70 m/min giving a flank wear of 0.2 mm. The results are found in Table 1.

TABLE 1

| Grade | Time in cut [min] |
| --- | --- |
| Invention | 14.50 |
| Seco CP200 | 10.25 |

This test shows that the inserts according to the invention achieve 40% longer tool life than Seco CP200.

Example 3

Coated inserts from Example 1 were tested with regard to wear resistance at the following conditions: Seco CP200 was used as reference.

| | |
| --- | --- |
| Work piece: | Cylindrical bar |
| Material: | Inconel 718 |
| Cutting speed: | 70, 90, 110 m/min |
| Feed: | 0.15 mm/rev |
| Depth of cut: | 0.5 mm |
| Remarks: | Flood coolant |

Results

The time in minutes to a flank wear of 0.2 mm was measured at three different cutting speeds. The results are found in Table 2.

TABLE 2

| | Cutting speed | | |
| --- | --- | --- | --- |
| | 70 | 90 | 110 |
| Invention | 15.0 | 11.0 | 6.0 |
| Seco CP200 | 10.5 | 7.0 | 4.5 |

This test shows that the inserts according to the invention increase productivity 30% compared to Seco CP200.

Example 4

Coated inserts from Example 1 were tested with regard to wear resistance at the following conditions: As references three grades from market leading competitors were used, all three grades intended for the application in question.

| | |
| --- | --- |
| Work piece: | Special shaft |
| Material: | Inconel 718 |
| Cutting speed: | 40, 110 m/min |
| Feed: | 0.20 mm/rev |
| Depth of cut: | 0.25 mm |
| Remarks: | Flood coolant |

Results

Reference grades all machined one shaft at the maximum cutting speed of 40 m/min. The inserts according to the invention managed to machine one component at the cutting speed 110 m/min.

This test shows that the inserts according to the invention increase productivity and speed capability compared to the references.

When ranges are used herein for physical properties, such as molecular weight, or chemical properties, such as chemical formulae, all combinations and subcombinations of ranges specific embodiments therein are intended to be included.

The disclosures of each patent, patent application, and publication cited or described in this document are hereby incorporated herein by reference, in their entirety.

Those skilled in the art will appreciate that numerous changes and modifications can be made to the preferred embodiments of the invention and that such changes and modifications can be made without departing from the spirit of the invention. It is, therefore, intended that the appended claims cover all such equivalent variations as fall within the true spirit and scope of the invention.

What is claimed is:

1. A cutting tool insert having a flank face, comprising:
   a. a cemented carbide body having an edge radius, comprising:
      tungsten carbide (WC);
      about 4.0 wt-% to about 7.0 wt-% cobalt (Co);
      about 0.25 wt-% to about 0.50 wt-% chromium (Cr); and
      wherein said cemented carbide body has a coercivity, Hc, of about 28 kA/m to about 38 kA/m; and
   b. a single layer coating
      comprising $(Ti_{1-x}Si_x)N$, wherein x is between about 0.1 and about 0.25;
      wherein said layer has a crystal structure of NaCl type and a total thickness of between 0.5 μm and 2.0 μm measured on the middle of said flank face;
      wherein said layer has a texture coefficient TC(200) >about 2.0, the texture coefficient (TC) being defined as:

$$TC(hkl) = \frac{I(hkl)}{I_0(hkl)} \left[ \frac{1}{n} \sum_{n=1}^{n} \frac{I(hkl)}{I_0(hkl)} \right]^{-1}$$

where:
I(hkl)=intensity of the (hkl) reflection;
$I_o$(hkl)=standard intensity according to JCPDS card no 38-1420;
n=number of reflections used in the calculation;
(hkl) reflections used are: (111), (200), (220).

2. The cutting tool insert of claim 1, wherein said Co is present at a level of about 4.5 wt-% to about 6.0 wt-%.

3. The cutting tool insert of claim 1, wherein said Cr is present at a level of about 0.30 wt-% to about 0.45 wt-%.

4. The cutting tool insert of claim 1, wherein said cemented carbide body has a coercivity, Hc, of about 30 kA/m to about 36 kA/m.

5. The cutting tool insert of claim 1, wherein x is between about 0.12 and about 0.23.

6. The cutting tool insert of claim 1, wherein said layer has a total thickness between about 0.7 μm and about 1.5 μm measured on the middle of the flank face.

7. The cutting tool insert of claim 1, wherein said layer has a texture coefficient TC(200) of greater than about 2.0.

8. The cutting tool insert of claim 1, wherein said layer further comprises Al;
wherein said Al is presented in said layer in the ratio of $(Ti_{1-a-b}Si_aAl_b)N$;
where: b<a;
about $0.1 \leq a \leq$ about 0.25; and
0.10<a+b<about 0.30.

9. The cutting tool insert of claim 1, wherein said edge radius of said body is between about 0 μm and about 25 μm.

* * * * *